United States Patent
Heu

(10) Patent No.: US 7,457,048 B2
(45) Date of Patent: Nov. 25, 2008

(54) HIGH MAGNIFICATION ZOOM LENS SYSTEM

(75) Inventor: Min Heu, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/893,147

(22) Filed: Aug. 15, 2007

(65) Prior Publication Data
US 2008/0094726 A1 Apr. 24, 2008

(30) Foreign Application Priority Data
Oct. 24, 2006 (KR) .................. 10-2006-0103689

(51) Int. Cl.
*G02B 15/14* (2006.01)
(52) U.S. Cl. ..................... 359/687; 359/686
(58) Field of Classification Search ............. 359/684, 359/685, 686, 687
See application file for complete search history.

(56) References Cited

U.S. PATENT DOCUMENTS 7,173,769 B2 * 2/2007 Park ..................... 359/687
7,221,518 B2 * 5/2007 Kim et al. ............. 359/687
2007/0217026 A1 * 9/2007 Nishimura .............. 359/692
2008/0117528 A1 * 5/2008 Yoneyama ............. 359/687

FOREIGN PATENT DOCUMENTS

| JP | 09-133858 A | 5/1997 |
|----|-------------|--------|
| JP | 2003-202500 A | 7/2003 |
| JP | 2004-184627 A | 7/2004 |

* cited by examiner

*Primary Examiner*—David N Spector
(74) *Attorney, Agent, or Firm*—Drinker Biddle & Reath LLP

(57) ABSTRACT

A high magnification zoom lens system includes first through fifth lens groups respectfully arranged sequentially from an object side. At least one of the first through fifth lens groups moves during magnification change, the first lens group comprises a reflection member, and the zoom lens system satisfies the conditions $$3.8 \le \frac{f_T}{f_W} \le 6.0 \text{ and } 1.50 \le \frac{L_T}{f_T} \le 1.88,$$

wherein "$f_W$" denotes the focal distance at the wide angle position, "$f_T$" denotes the focal distance at the telephoto position, and "$L_T$" denotes the overall length of the zoom lens system from the lens surface on the object side to an image plane, at the telephoto position.

20 Claims, 11 Drawing Sheets

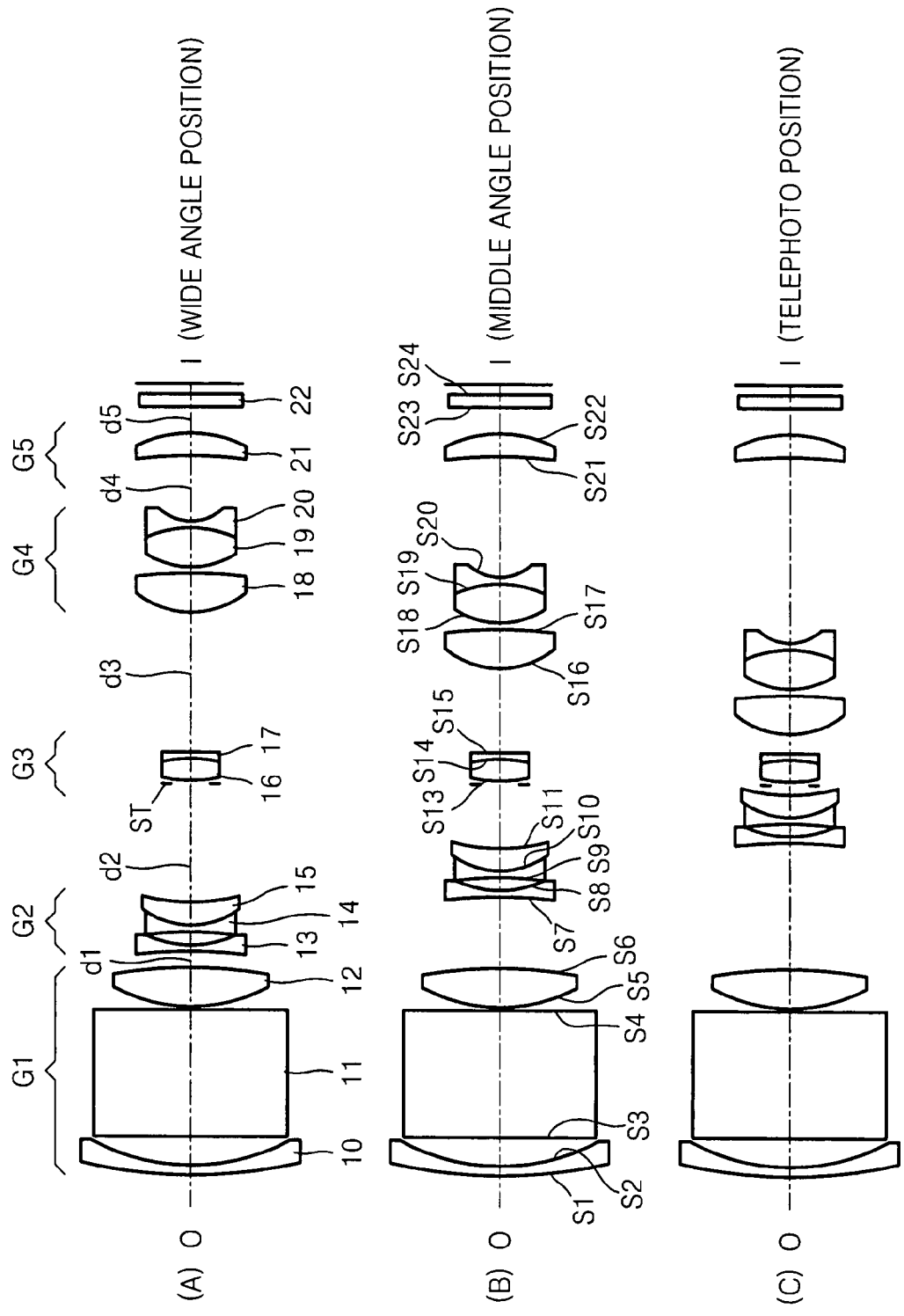

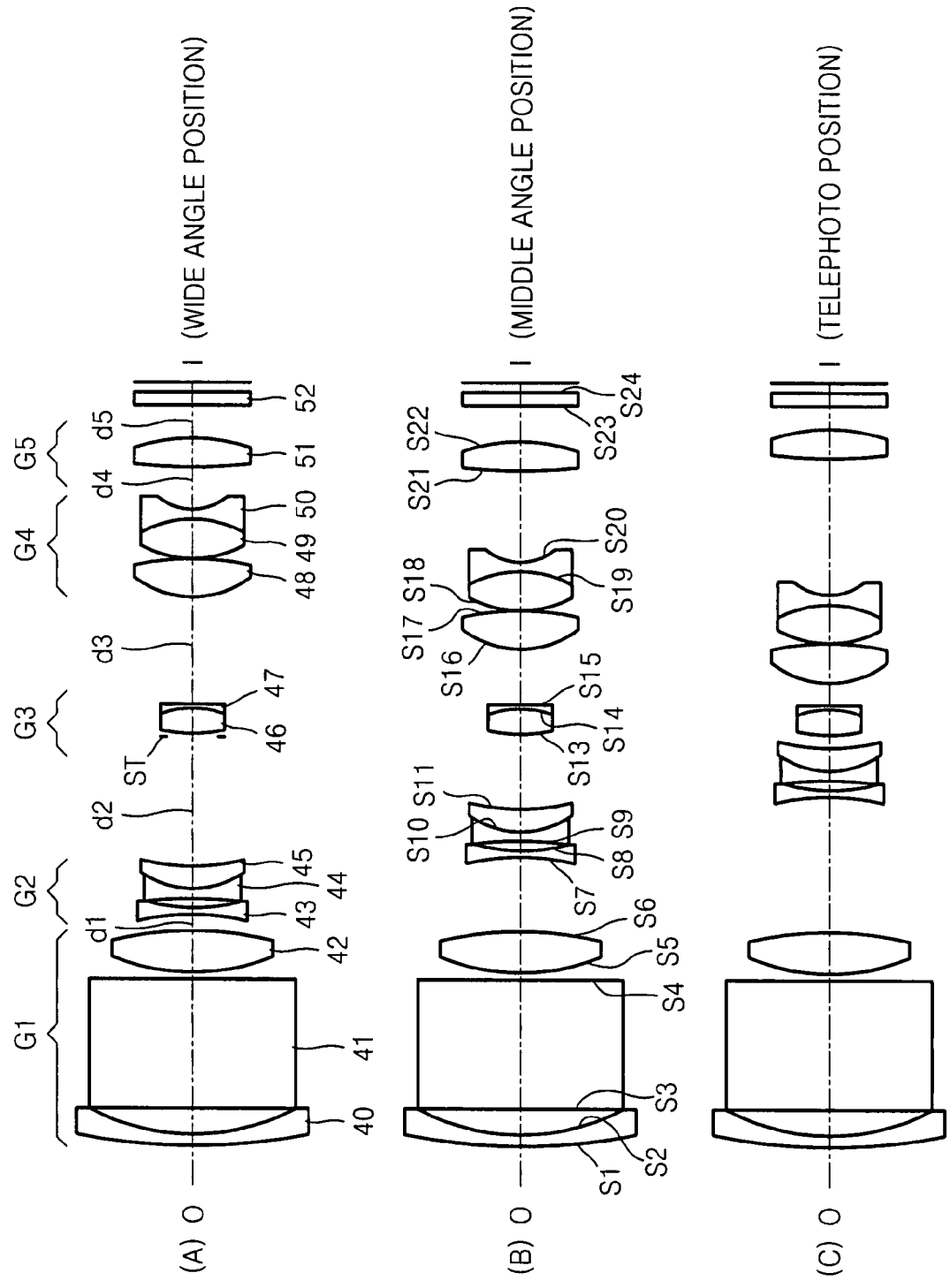

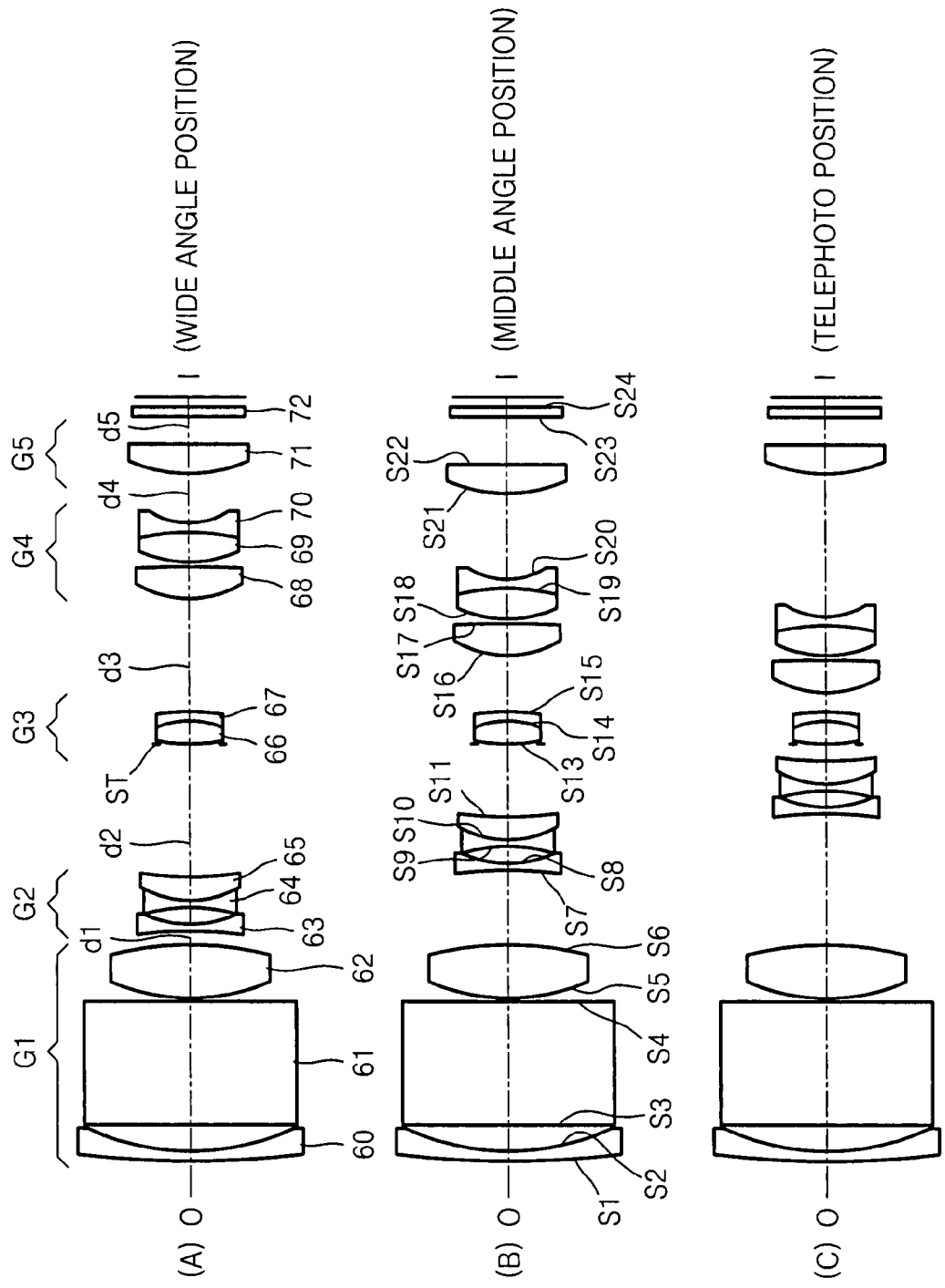

FIG. 7C
| | ------- 656.2800 NM |
| | ------- 587.5600 NM |
| | ———— 486.1300 NM |
LONGITUDINAL
SPHERICAL ABERRATION    FIELD OF CURVATURE    DISTORTION
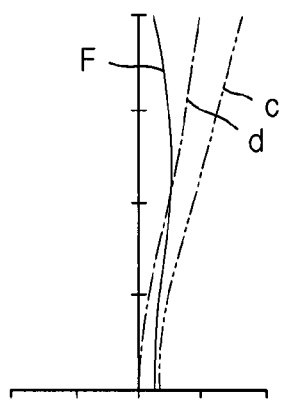
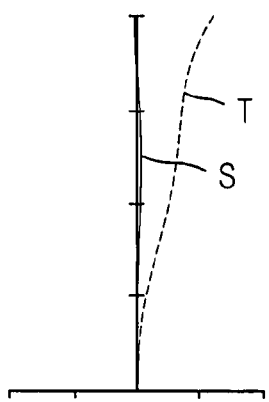
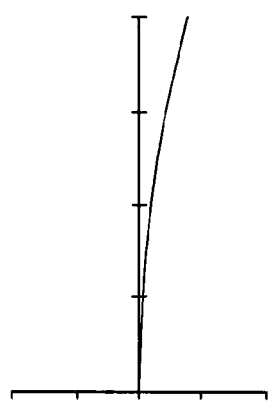

HIGH MAGNIFICATION ZOOM LENS SYSTEM

CROSS-REFERENCE TO RELATED PATENT APPLICATIONS

This application claims the benefit of Korean Patent Application No. 10-2006-0103689, filed on Oct. 24, 2006, in the Korean Intellectual Property Office, the disclosure of which is incorporated herein in its entirety by reference.

BACKGROUND OF THE INVENTION

1. Field of the Invention

The present invention relates to a slim, compact high, magnification zoom lens.

2. Description of the Related Art

A zoom lens system for a still camera or a video camera must usually be compact and have superior optical performance and a high magnification ratio. As electronic devices such as portable information terminals, personal digital assistants (PDAs), and mobile phones become more popular, they now often include a digital imaging unit or digital video unit. Accordingly, the demand for compact cameras is further increased. As digital cameras become popular, people wish to carry them constantly, regardless of the need for photography, unlike film cameras, and thus the demand for compact, slim, and lightweight cameras is increasing.

Slim, compact cameras are classified as a slider type in which the zoom lens protrudes out of the camera body during use and is kept inside the camera body when not used, and a refraction type in which a reflector such as a prism is used to reduce the thickness of a lens system.

The thickness of a refraction type optical system including a prism can be minimized by changing the optical path of light by 90° in the middle of the optical system using the prism. For slim, compact digital cameras, a 3× zoom is common but the demand for high magnification of over 5× zoom is increasing.

Japanese Patent Publication No. 2003-202500 discloses the zoom lens shown in FIG. 1, which consists of a first lens group Gr1 including a reflection surface which has a positive refractive power and changes the optical axis by 90°, a second lens group Gr2 having a negative refractive power, a third lens group Gr3 having a positive refractive power, a fourth lens group Gr4 having a positive refractive power, and a fifth lens group Gr5. All the lens groups are separated from each other by air gaps which vary when changing the magnification.

The magnification of the zoom lens optical system can be changed by a factor of about 3 to 6. The reflection member is relatively large and two or more lenses are arranged in front of the reflection member. As a result, the size of this optical system is undesirably large for a slim, compact camera.

SUMMARY OF THE INVENTION

The present invention provides a zoom lens system which has high magnification, is slim and compact, and is relatively inexpensive.

According to an aspect of the present invention, a high magnification zoom lens system comprises first through fifth lens groups arranged sequentially from a object side, respectively, wherein at least one of the first through fifth lens groups moves during magnification change, the first lens group comprises a reflection member, and the zoom lens system satisfies the conditions $$3.8 \le \frac{f_T}{f_W} \le 6.0 \text{ and } 1.50 \le \frac{L_T}{f_T} \le 1.88,$$

wherein "$f_W$" denotes the focal distance at the wide angle position, "$f_T$" denotes the focal distance at the telephoto position, and "$L_T$" denotes the overall length of the zoom lens system from the lens surface on the object side to an image plane, at the telephoto position.

According to another aspect of the present invention, a high magnification zoom lens system comprises a reflection member, a first lens group having a positive refractive power, a second lens group having a negative refractive power, a third lens group having a positive refractive power, a fourth lens group having a positive refractive power, and a fifth lens group having a positive refractive power, which are arranged sequentially from a object side, respectively, and satisfies the conditions $$3.8 \le \frac{f_T}{f_W} \le 6.0 \text{ and } 1.50 \le \frac{L_T}{f_T} \le 1.95,$$

wherein "$f_W$" denotes the focal distance at the wide angle position, "$f_T$" denotes the focal distance at the telephoto position, and "$L_T$" denotes the overall length of the zoom lens system from the lens surface on the object side to an image plane, at the telephoto position.

At least the second lens group and the fourth lens group may move during magnification change. During magnification change, the interval between the second lens group and the third lens group may decrease and the interval between the third lens group and the fourth lens group may decrease. The first lens group may include a first lens element having a negative refractive power, a reflection member, and a second lens element having a positive refractive power and including an aspherical surface. The fourth lens group may include a lens element having a positive refractive power and a doublet having a negative refractive power, sequentially from the object side.

BRIEF DESCRIPTION OF THE DRAWINGS

The above and other features and advantages of the present invention will become more apparent by the followed detailed description of preferred embodiments with reference to the attached drawings in which:

FIGS. 2A, 2B, and 2C show the configuration at a wide angle position, a middle angle position, and a telephoto position of a high magnification zoom lens system according to an embodiment of the present invention;

FIGS. 4A, 4B, and 4C show the configuration at a wide angle position, a middle angle position, and a telephoto position of a high magnification zoom lens system according to another embodiment of the present invention;

FIGS. 6A, 6B, and 6C show the configuration at a wide angle position, a middle angle position, and a telephoto position of a high magnification zoom lens system according to another embodiment of the present invention;

FIG. 7C shows spherical aberration, field curvature, and distortion at the telephoto position of the high magnification zoom lens system of FIGS. 6A, 6B, and 6C.

DETAILED DESCRIPTION OF THE INVENTION

Figure 1:
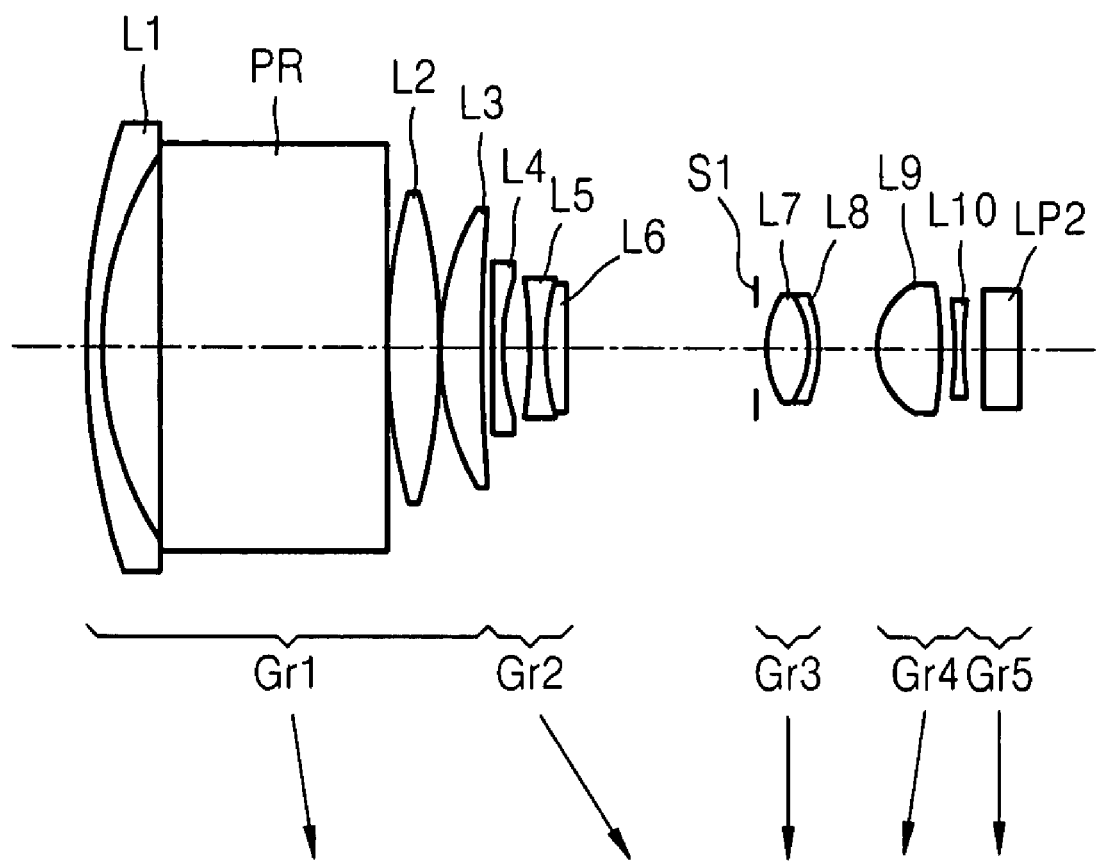
FIG. 1 illustrates a zoom lens system according to Japanese Patent publication No. 2003-202500.

Referring to FIGS. 2A, 2B, and 2C, a zoom lens system according to an embodiment of the present invention includes first through fifth lens groups G1, G2, G3, G4, and G5 sequentially arranged from the object side. The first lens group G1 includes a reflection member 11 which can be a prism or reflection mirror. Also, at least one of the first through fifth lens groups moves during change of magnification of the zoom lens system.

The zoom lens system according to the present embodiment has a high magnification which varies within the following range.

$$3.8 \le \frac{f_T}{f_W} \le 6.0 \quad \text{[Inequality 1]}$$

Inequality 1 defines the magnification of the zoom lens system, where "$f_W$" denotes the focal distance at the wide angle position and "$f_T$" denotes the focal distance at the telephoto position. In Inequality 1, when the magnification is over the upper limit, the magnification goes high but it is different to correct longitudinal chromatic aberration, lateral chromatic aberration and coma flare, so that it is difficult to secure sufficient optical performance for an optical system using a high resolution solid-state image sensing device. In contrast, when the magnification is below the lower limit, the magnification is too small, and a smaller, simpler and less expensive structure could be used to provide the same magnification.

Inequality 2 shows the size of the optical system.

$$1.50 \le \frac{L_T}{f_T} \le 1.95 \quad \text{[Inequality 2]}$$

In Inequality 2, "$L_T$" denotes the overall distance from the object to the image plane at the telephoto position and "$f_T$" denotes the focal distance at the telephoto position. The focal distance at the telephoto position is determined by the zoom magnification and the size of the image plane. When the focal distance at the telephoto position exceeds the upper limit in Inequality 2, the zoom magnification is too small to achieve the high magnification optical system or the overall length of the optical system is lengthy. In contrast, when the focal distance at the telephoto position is less than the lower limit, the size of the image plane increases so that it is difficult to form a compact optical system. More preferably, the zoom lens according to the present embodiment satisfies Inequality 3.

$$1.50 \le \frac{L_T}{f_T} \le 1.88 \quad \text{[Inequality 3]}$$

The first lens group G1 has a positive refractive power, the second lens group G2 has a negative refractive power, the third lens group G3 has a positive refractive power, the fourth lens group G4 has a positive refractive power, and the fifth lens group G5 has a positive refractive power. The first lens group G1 may consist of a single lens element 10 having a negative refractive power, a reflection member 11, and a single lens element 12 having a positive refractive power, arranged sequentially from the object side. The second lens group G2 may consist of a single lens element 13 having a negative refractive power and a doublet formed of combined lens elements 14 and 15 having a negative refractive power, arranged sequentially from the object side. The third lens group G3 may consist of a single lens element having a positive refractive power and an aperture stop, or a doublet formed of combined lens elements 16 and 17 having a positive refractive power and an aperture stop ST. FIG. 2 shows an example of the third lens group G3 including of the doublet.

The fourth lens group G4 may consist of a single lens element 18 having a positive refractive power and a doublet formed of combined lens elements 19 and 20 having a negative refractive power. The fifth lens group G5 may consist of a single lens element 21 which is formed of plastic.

During magnification change, the second lens group G2 moves toward the image plane I and the fourth lens group G4 moves toward the object plane O. The fourth lens group G4 or the fifth lens group G5 perform the movement of the image plane (i.e., the focus adjustment) according to the change in the object distance.

In the present invention, the first lens group G1 includes a reflection member 11, the single lens element 10 has a negative refractive power and is arranged in front of the reflection member 11, and the single lens element 12 has a positive refractive power and is arranged behind the reflection member 11, and the reflection member 11 changes the optical path of light by 90° to minimize the thickness of the optical system. Also, at least one surface of the single lens 12 is aspherical, to minimize spherical aberration, astigmatism, and distortion.

The second lens group G2 has a strong negative refractive power to perform the magnification by a factor of 5 with the fourth lens group G4, and includes a doublet to minimize chromatic aberration at the telephoto position. The third lens group G3 includes a lens having a positive refractive power and an aperture stop. The lens can be formed of a single lens element or a doublet. When the doublet is used, the optical performance at the wide angle position can be improved by reducing chromatic aberration.

The fourth lens group G4 maximizes correction of spherical aberration by arranging the dual convex single lens element 18 at the object side and using an aspherical surface on the single lens element 18. Also, longitudinal chromatic aberration and lateral chromatic aberration are minimized by adopting a doublet formed of the combined lens elements 19 and 20 having a negative refractive power toward the image plane.

In the definition of an aspherical surface in the present embodiment, when the optical axis is an X axis, a direction perpendicular to the optical axis direction is a Y axis, and the light path assumed to be a positive direction, the aspherical shape of the zoom lens according to the present invention can be expressed by the following equation. In the equation, "x" denotes the distance from the apex of the lens along the optical axis, "y" denotes the distance perpendicular to the optical axis, "K" denotes a conic constant, "A, B, C, and D" denote aspherical coefficients, and "c" denotes the reciprocal of the radius of curvature (1/R) at the apex of the lens.

$$x = \frac{cy^2}{1 + \sqrt{1 - (K+1)c^2 y^2}} + Ay^4 + By^6 + Cy^8 + Dy^{10} \quad \text{[Equation 4]}$$

The fifth lens group G5 includes a single lens element 21 having a positive refractive power, which corrects remaining astigmatism and simultaneously optimizes the angle of a light beam incident on a solid-state image sensing device. Since the single lens element 21 has a long focal distance and a small amount of aberration correction, it may be formed of plastic having a low sensitivity in order to save costs. In FIG. 2, reference numeral 22 indicates a cover glass.

The fourth lens group G4 or fifth lens group G5 performs the correction of the image plane according to the change in the object distance. When the image plane is corrected by the fifth lens group G5, not only for the image plane correction but also during magnification change, it becomes easy to provide the magnification change using a single motor and to reduce the overall length of the optical system owing to the degree of freedom in the aberration correction.

In the present embodiment, at least the second lens group and fourth lens group move during magnification change. During magnification change from wide angle position to telephoto position, the interval between the second lens group and the third lens group decreases while the interval between the third lens group and the fourth lens group decreases.

Next, the zoom lens according to the present invention satisfies the following condition.

$$0.6 \leq \frac{f_3}{\sqrt{f_W f_T}} \leq 2.0 \quad \text{[Inequality 5]}$$

In Inequality 5, "$f_W$" denotes the focal distance at the wide angle position, "$f_T$" denotes the focal distance at the telephoto position, and "$f_3$" denotes the focal distance of the third lens group. Inequality 5 concerns the focal distance of the third lens group. When the focal distance of the third lens group exceeds the upper limit, the magnification of the third lens group at the wide angle position decreases so that the overall length of the entire lens system increases. In contrast, when the focal distance of the third lens group is less than the lower limit, the refractive power of the third lens group increases too much so that excessive aberration is generated.

Also, it is preferable that the fifth lens group G5 has the following magnification when performing the function of the image plane correction according to the change in the object distance.

$$0.65 \leq |m_5| \leq 0.90 \quad \text{[Inequality 6]}$$

In Inequality 6, "$m_5$" denotes the magnification of the fifth lens group at the telephoto position when the object distance is infinite. When the magnification of the fifth lens group exceeds the upper limit of Inequality 6, the amount of movement of the fifth lens group according to the movement of the image plane becomes great, so that a movement period and the time for the image plane correction becomes too long. In contrast, when the magnification is less than the lower limit, the movement of the fifth lens group for image plane correction becomes very small and needs very fine control.

The present invention allows a magnification change of about 5 times, and minimizes the thickness of the optical system by optimizing the size of the reflection member such as a prism and positioning only one lens on the object side of the reflection member. Also, cost can be reduced by using only 11 or 12 lens elements, and a slim, compact zoom lens can be obtained at a low cost by shortening the overall length of the optical system.

The slim compact zoom lens system can be appropriately used for an imaging device included in or attached to ultra-compact digital cameras or digital video cameras, mobile phones, portable information terminals, and personal digital assistants (PDAs).

The present invention includes lenses according to optimal conditions to embody the miniaturization of a zoom lens through embodiments according to the following diverse designs. Detailed lens data of a variety of embodiments of a zoom lens system according to the present invention are described below. In the following embodiments, "f" denotes the synthesized focal distance of the overall zoom lens system, "Fno" denotes an F number, "2ω" denotes the angle of view, "r" denotes a radius of curvature, "d" denotes the thickness of the center of a lens or the interval between lenses, "nd" denotes a refractive index, and "vd" denotes an Abbe number. Also, "ST" denotes an aperture stop and "d1, d2, d3, d4, and d5" denote variable distances.

Embodiment 1

FIGS. 2A, 2B, and 2C show a zoom lens system according to an embodiment of the present invention which includes the first through fifth lens groups G1, G2, G3, G4, and G5.

TABLE 1 f: 6.00~13.51~32.97, Fno: 3.62~4.77~6.48, 2ω: 61.44~29.84~12.34

| | Radius of Curvature (r) | Thickness or Distance (d) | Refractive Index (nd) | Abbe Number (vd) |
|---|---|---|---|---|
| S1 | 37.829 | 0.65 | 1.92286 | 20.88 |
| S2 | 14.521 | 2.03 | | |
| S3 | infinity | 8.60 | 1.92286 | 20.88 |
| S4 | infinity | 0.30 | | |

TABLE 1-continued f: 6.00~13.51~32.97, Fno: 3.62~4.77~6.48, 2ω: 61.44~29.84~12.34

|     | Radius of Curvature (r) | Thickness or Distance (d) | Refractive Index (nd) | Abbe Number (vd) |
|-----|---|---|---|---|
| S5  | 12.209 | 2.68 | 1.63758 | 60.45 |
|     | K: -0.694571 | | | |
|     | A: -0.374792E-05 B: 0.369924E-07 C: -0.692696E-08 | | | |
|     | D: 0.600702E-09 | | | |
| S6  | -23.879 | d1 | | |
|     | K: -5.440827 | | | |
|     | A: 0.127453E-04 B: -0.327023E-06 C: 0.161365E-07 | | | |
|     | D: 0.200010E-09 | | | |
| S7  | -58.251 | 0.45 | 1.75500 | 52.32 |
| S8  | 7.978 | 0.87 | | |
| S9  | -35.666 | 1.734227 | 0.45 | 53.45 |
| S10 | 5.640 | 1.63 | 1.922859 | 20.88 |
| S11 | 14.377 | d2 | | |
| ST  | Infinity | 0 | | |
| S13 | 11.096 | 1.52 | 1.700514 | 36.23 |
| S14 | -7.352 | 0.45 | 1.911648 | 25.87 |
| S15 | -87.217 | d3 | | |
| S16 | 6.427 | 2.85 | 1.51913 | 76.59 |
| S17 | -16.41874 | 0.23 | | |
|     | K: -4.873103 | | | |
|     | A: 0.471717E-03 B: 0.144794E-05 C: | | | |
| S18 | 5.763 | 2.80 | 1.53875 | 57.48 |
| S19 | -7.494 | 0.45 | 1.84845 | 36.00 |
| S20 | 3.952 | d4 | | |
| S21 | 968.222 | 1.86 | 1.53120 | 55.70 |
|     | K: 10 | | | |
|     | A: -0.290904E-04 B: -0.251500E-04 C: 0.228308E-05 | | | |
| S22 | -8.952 | d5 | | |
| S23 |  | 1.05 | 1.5168 | 64.2 |
| S24 | infinity | 0.65 | | |

Table 2 shows examples of the variable distances d1, d2, d3, d4, and d5 in the zoom lens system of the present embodiment at the wide angle position, the middle angle position, and the telephoto position.

TABLE 2

|     | Wide Angle position | Middle angle position | Telephoto position |
|-----|---|---|---|
| d1 (units?) | 1.000 | 4.753 | 8.506 |
| d2 (units?) | 8.456 | 4.703 | 0.950 |
| d3 (units?) | 9.511 | 5.640 | 1.300 |
| d4 (units?) | 4.089 | 8.054 | 12.245 |
| d5 (units?) | 1.666 | 1.559 | 1.688 |

Figure 3A:
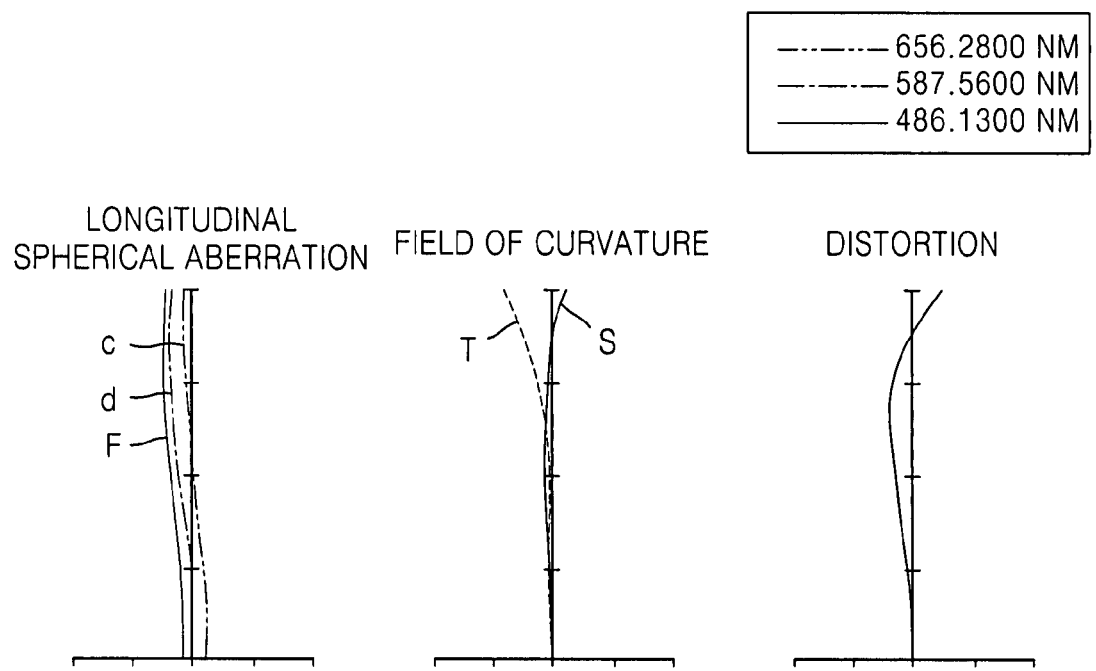
FIG. 3A shows spherical aberration, field curvature, and distortion at the wide angle position of the high magnification zoom lens system of FIGS. 2A, 2B, and 2C.
Figure 3B:
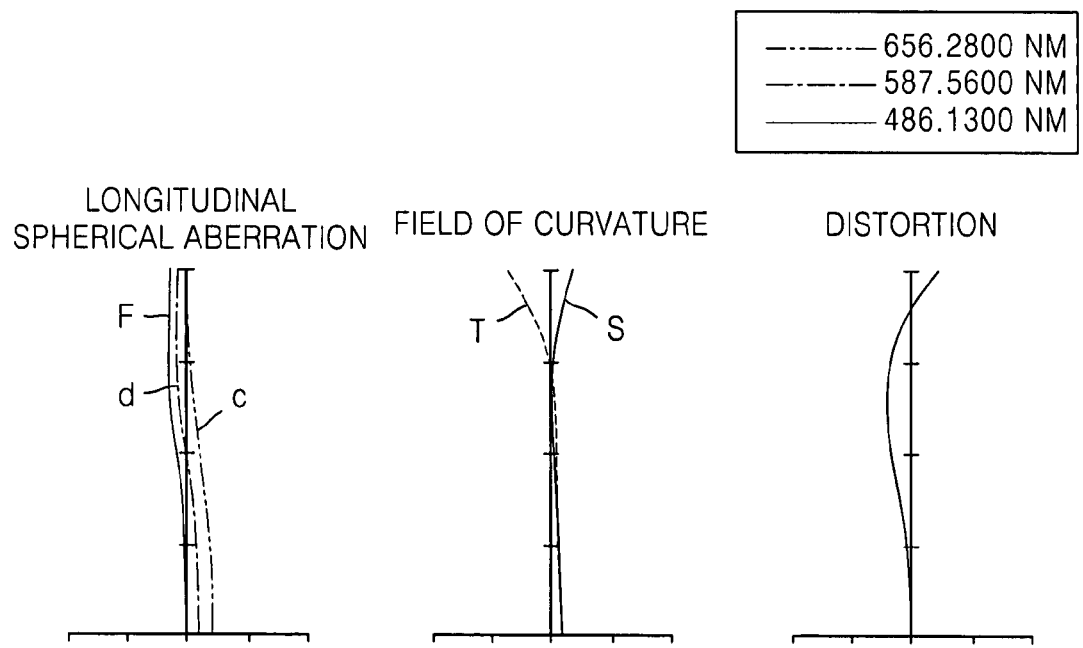
FIG. 3B shows spherical aberration, field curvature, and distortion at the middle angle position of the high magnification zoom lens system of FIGS. 2A, 2B, and 2C.
Figure 3C:
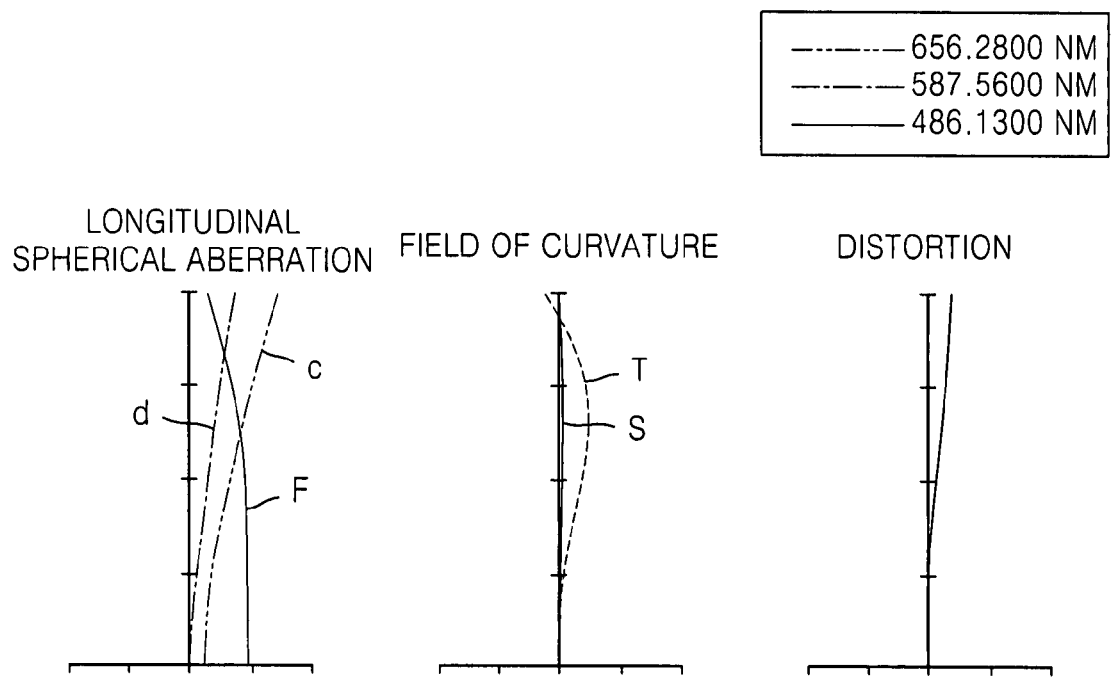
FIG. 3C shows spherical aberration, field curvature, and distortion at the telephoto position of the high magnification zoom lens system of FIGS. 2A, 2B, and 2C.

FIGS. 3A, 3B, and 3C respectively show longitudinal spherical aberration, field curvature, and distortion at the wide angle position, middle angle position, and telephoto position of the zoom lens according to the present embodiment. It can be seen that the values are good. The longitudinal spherical aberration is indicated by Fraunhofer's lines c, d, and F while the field curvature and the distortion are indicated by tangential field curvature T and sagittal field curvature S.

Embodiment 2

FIGS. 4A, 4B, and 4C show a zoom lens system according to another embodiment of the present invention. The first lens group G1 includes a first lens element 40, a reflection member 41, and a second lens element 42, the second lens group G2 includes a third lens element 43 and first combined lens elements 44 and 45, the third lens group G3 includes an aperture ST and second combined lens elements 46 and 47, the fourth lens group G4 includes fourth, fifth, and sixth lens elements 48, 49, and 50, and the fifth lens group G5 includes a seventh lens element 51. The zoom lens system further includes a cover glass 52.

TABLE 3 f: 6.00~13.27~28.50, Fno: 3.65~4.54~5.39, 2ω: 62.57~31.10~14.29

| Surface | Radius of Curvature (r) | Thickness or Distance (d) | Refractive Index (nd) | Abbe Number (vd) |
|-----|---|---|---|---|
| S1  | 40.223 | 0.65 | 1.84666 | 23.78 |
| S2  | 13.936 | 1.841 | | |
| S3  | Infinity | 8.6 | 1.834 | 37.34 |
| S4  | Infinity | 0.3 | | |
| S5  | 12.028 | 2.794 | 1.59557 | 63.76 |
|     | K: -0.644871 | | | |
|     | A: -0.698588E-06 B: 0.528857E-07 C: -0.108341E-07 | | | |
| S6  | -19.366 | d1 | | |
|     | K: -5.282013 | | | |
|     | A: 0.109152E-04 B: -0.401090E-06 C: 0.151708E-07 | | | |
|     | D: 0.141821E-09 | | | |
| S7  | -31.874 | 0.45 | 1.755 | 52.32 |
| S8  | 9.332 | 0.86 | | |
| S9  | -20.223 | 0.45 | 1.67478 | 57.43 |
| S10 | 5.532 | 1.668 | 1.84666 | 23.78 |
| S11 | 15.979 | d2 | | |
| ST  | Infinity | 0 | | |
| S13 | 11.224 | 1.607 | 1.7319 | 43.23 |
| S14 | -6.346 | 0.45 | 1.90366 | 31.31 |
| S15 | -48.076 | d3 | | |
| S16 | 6.236 | 2.53 | 1.51585 | 68.27 |
| S17 | -14.461 | 0.1 | | |
|     | K: -6.307089 | | | |
|     | A: 0.496629E-03 B: -0.780880E-06 C: -0.435658E-06 | | | |
| S18 | 6.154 | 2.42 | 1.52495 | 63.91 |
| S19 | -7.863 | 0.671 | 1.84786 | 36.17 |
| S20 | 3.775 | d4 | | |
|     | K: 8.299167 | | | |
|     | A: 0.396495E-03 B: -0.136397E-04 C: 0.211199E-05 | | | |
|     | D: -.732276E-07 | | | |
| S21 | 46.388 | 1.77 | 1.5312 | 56.51 |
| S22 | -12.777 | d5 | | |
| S23 | infinity | 1.05 | 1.5168 | 64.1 |
| S24 | infinity | | | |

Table 4 shows examples of the variable distances d1, d2, d3, d4, and d5 in the zoom lens system of the present embodiment at the wide angle position, the middle angle position, and the telephoto position.

TABLE 4

|     | Wide angle position | Middle position | Telephoto position |
|-----|---|---|---|
| d1  | 1.000 | 4.850 | 8.700 |
| d2  | 8.650 | 4.800 | 0.950 |
| d3  | 6.948 | 3.466 | 1.300 |
| d4  | 2.930 | 6.056 | 9.048 |
| d5  | 2.151 | 2.508 | 1.682 |

Figure 5A:
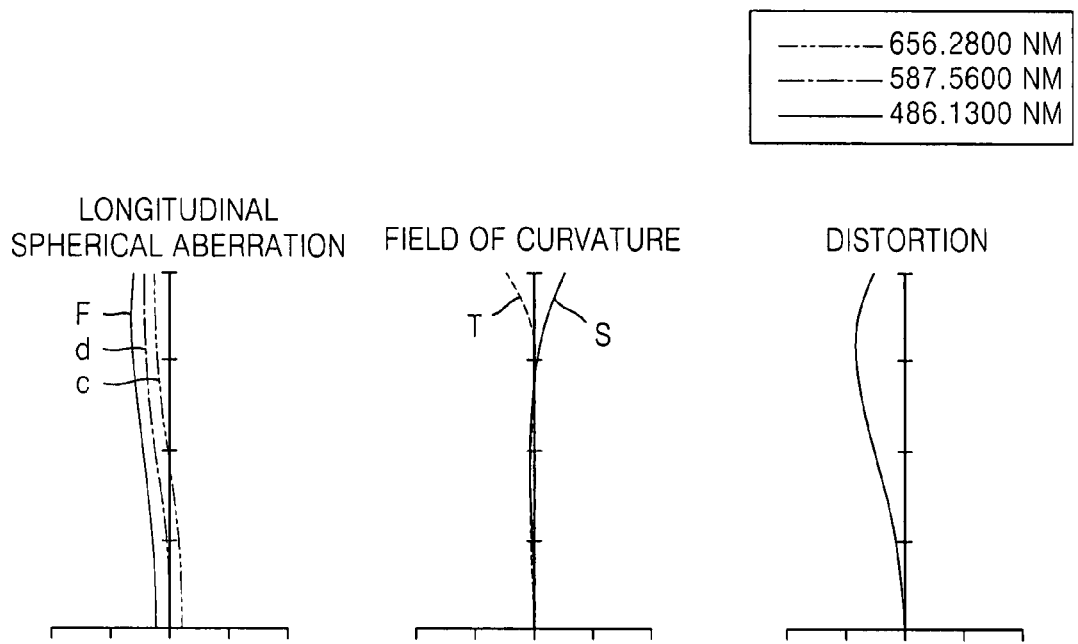
FIG. 5A shows spherical aberration, field curvature, and distortion at the wide angle position of the high magnification zoom lens system of FIGS. 4A, 4B, and 4C.
Figure 5B:
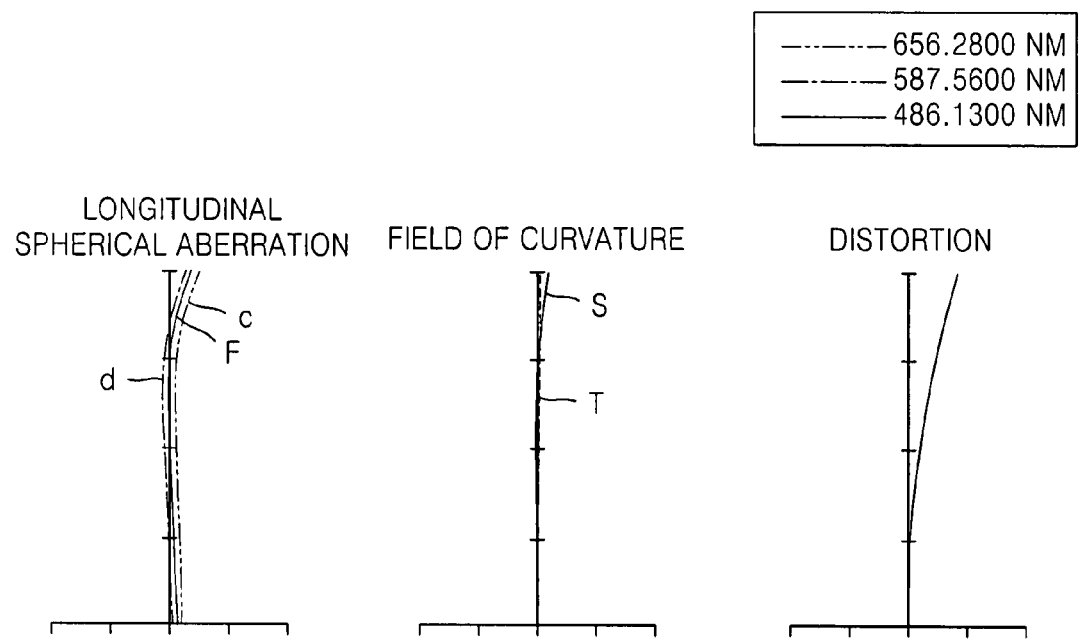
FIG. 5B shows spherical aberration, field curvature, and distortion at the middle angle position of the high magnification zoom lens of FIGS. 4A, 4B, and 4C.
Figure 5C:
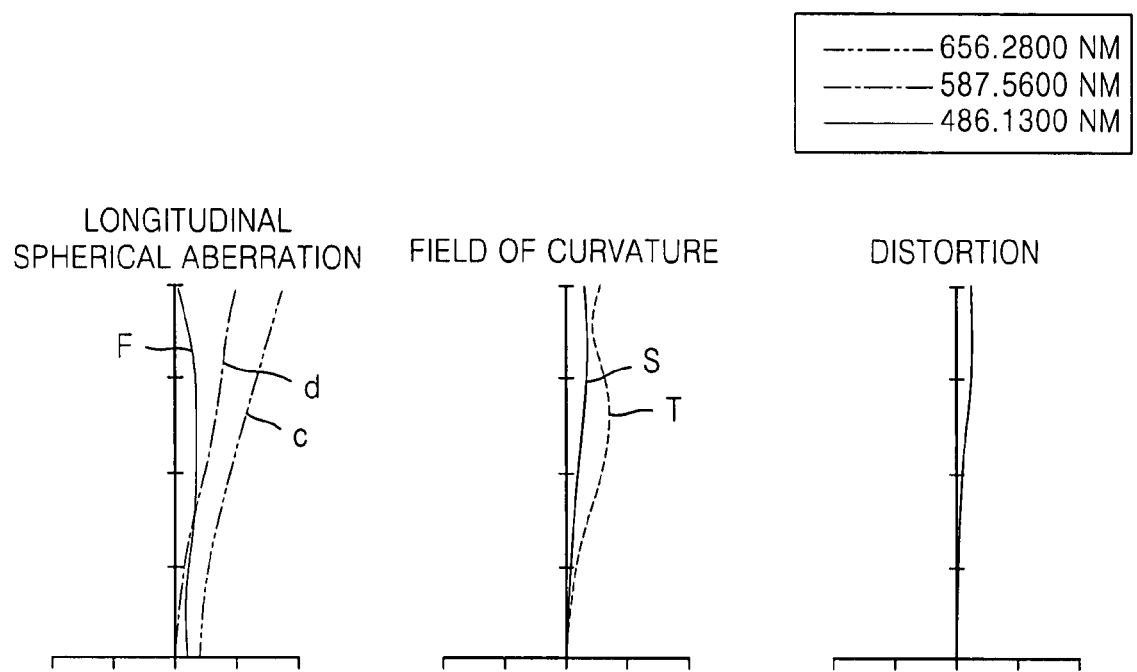
FIG. 5C shows spherical aberration, field curvature, and distortion at the telephoto position of the high magnification zoom lens system of FIGS. 4A, 4B, and 4C.

FIGS. 5A, 5B, and 5C respectively show longitudinal spherical aberration, field curvature, and distortion at the wide angle position, middle angle position, and telephoto position of the zoom lens system according to the present embodiment.

Embodiment 3

FIGS. 6A, 6B, and 6C show a zoom lens system according to another embodiment of the present invention. The first lens group G1 includes a first lens element 60, a reflection member 61, and a second lens element 62, the second lens group G2 includes a third lens element 63 and first combined lens elements 64 and 65, the third lens group G3 includes an aperture ST and second combined lens elements 66 and 67, the fourth lens group G4 includes fourth, fifth, and sixth lens elements 68, 69, and 70, and the fifth lens group G5 includes a seventh lens element 71. The zoom lens system further includes a cover glass 72.

TABLE 5 f: 6.31~12.66~29.59, Fno: 3.72~4.25~4.91, 2ω: 62.05~31.66~13.63

| Surface | Radius of Curvature (r) | Thickness or Distance (d) | Refractive Index (nd) | Abbe Number (vd) |
|---|---|---|---|---|
| S1 | 76.483 | 0.65 | 1.84666 | 23.78 |
| S2 | 18.072 | 1.72 | | |
| S3 | infinity | 8.60 | 1.83400 | 37.35 |
| S4 | infinity | 0.30 | | |
| S5 | 12.095 | 3.73 | 1.58913 | 61.25 |
| | K: −0.762734 | | | |
| | A: 0.000000E+00 B: 0.000000E+00 C: 0.000000E+00 | | | |
| | D: 0.000000E+00 | | | |
| S6 | −20.043 | d1 | | |
| | K: −5.032511 | | | |
| | A: 0.205073E−04 B: −0.419266E−06 C: 0.153598E−07 | | | |
| S7 | −34.794 | 0.45 | 1.83241 | 38.40 |
| S8 | 8.208 | 1.13 | | |
| S9 | −19.362 | 0.45 | 1.61800 | 63.40 |
| S10 | 6.447 | 1.54 | 1.92286 | 20.88 |
| S11 | 17.691 | d2 | | |
| ST | Infinity | 0 | | |
| S13 | 10.953 | 1.71 | 1.69121 | 39.87 |
| S14 | −6.500 | 0.45 | 1.84360 | 26.82 |
| S15 | −30.777 | d3 | | |
| S16 | 6.558 | 2.26 | 1.51443 | 63.28 |
| S17 | −29.693 | 0.30 | | |
| | K: −1.000000 | | | |
| | A: 0.601876E−03 B: −0.193876E−05 C: −0.154966E−06 | | | |
| | D: 0.152315E−08 | | | |
| S18 | 7.484 | 2.11 | 1.48749 | 70.44 |
| S19 | −13.336 | 0.60 | 1.80610 | 33.27 |
| S20 | 4.4618 | d4 | | |
| S21 | 10.336 | 2.15 | 1.53120 | 55.70 |
| | K: −1.000000 | | | |
| | A: 0.273030E−03 B: 0.208652E−05 C: 0.000000E+00 | | | |
| | D: 0.000000E+00 | | | |
| S22 | −52.843 | d5 | | |
| S23 | Infinity | 1.00 | | 64.20 |
| S24 | Infinity | 1.1 | | |

Table 6 shows examples of the variable distances d1, d2, d3, d4, and d5 in the zoom lens system of the present embodiment at the wide angle position, the middle angle position, and the telephoto position.

TABLE 6

| | Wide angle position | Middle position | Telephoto position |
|---|---|---|---|
| d1 | 0.90 | 5.07 | 9.23 |
| d2 | 9.23 | 5.07 | 0.90 |
| d3 | 7.98 | 3.99 | 1.60 |
| d4 | 3.47 | 5.99 | 9.85 |
| d5 | 1.70 | 3.16 | 1.70 |

Figure 7A:
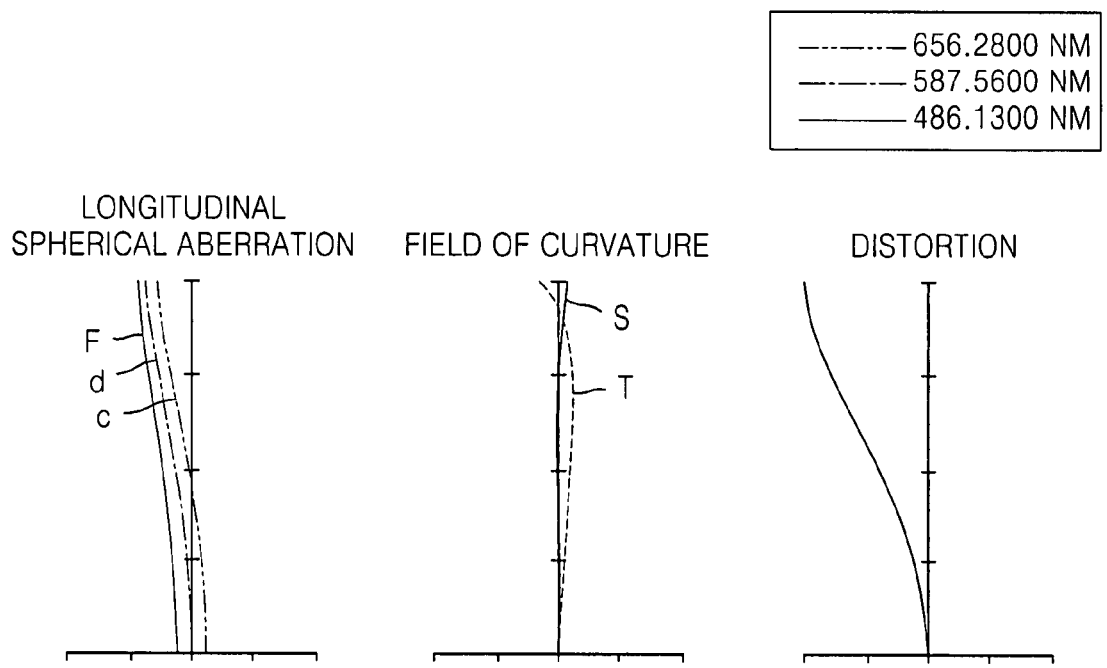
FIG. 7A shows spherical aberration, field curvature, and distortion at the wide angle position of the high magnification zoom lens system of FIGS. 6A, 6B, and 6C.
Figure 7B:
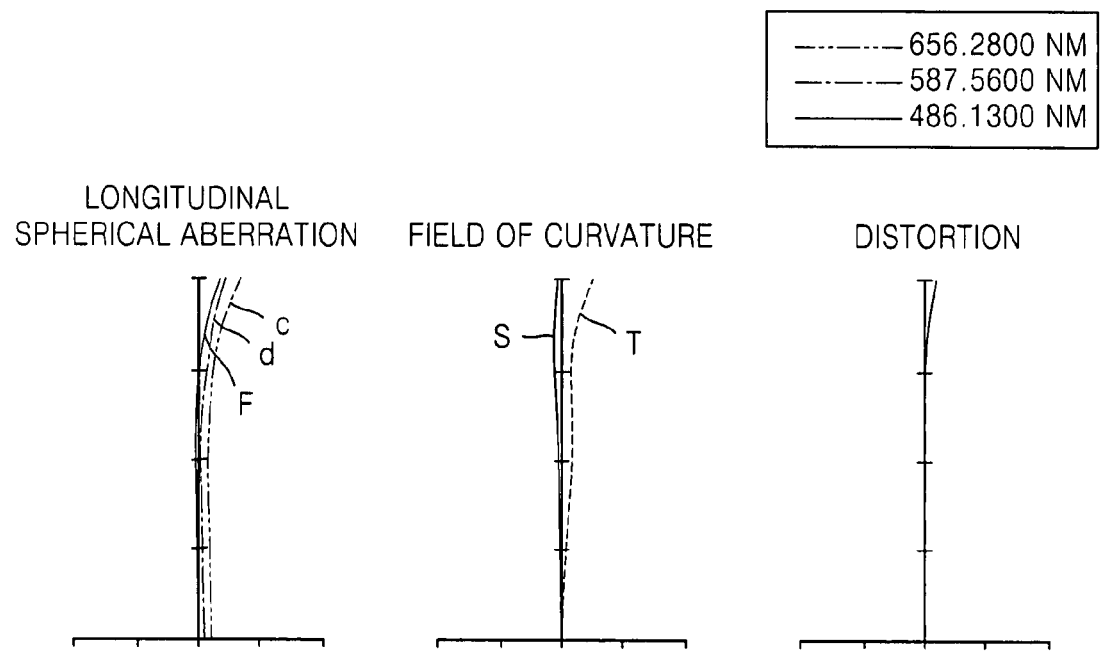
FIG. 7B shows spherical aberration, field curvature, and distortion at the middle angle position of the high magnification zoom lens of FIGS. 6A, 6B, and 6C.

FIGS. 7A, 7B, and 7C respectively show longitudinal spherical aberration, field curvature, and distortion at the wide angle position, middle angle position, and telephoto position of the zoom lens according to the present embodiment.

Figure 8:
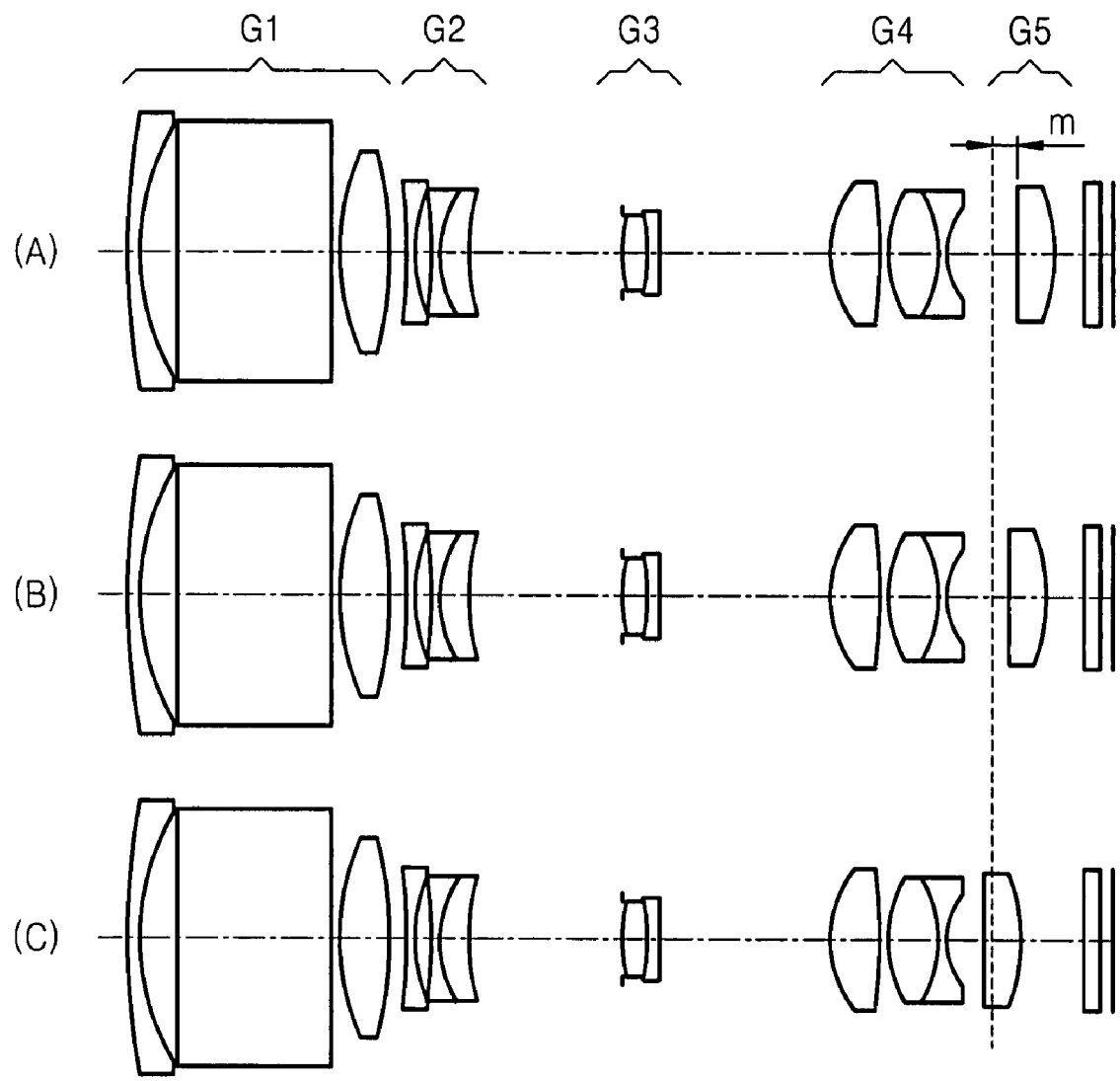
FIGS. 8A, 8B, and 8C illustrate the amount of lens movement according to the object distance at the wide angle position of the high magnification zoom lens system according to the present invention.

FIGS. 8A, 8B, and 8C illustrate the amount of (m) for correction of the image plane according to the change in the object distance at the wide angle position of the zoom lens system according to the present invention. In FIGS. 8A, 8B, and 8C, the object distances are respectively infinity, 30 cm, and 3 cm.

Table 7 shows that the first through third embodiments satisfy the above Inequalities 1, 2, 3, 5, and 6.

TABLE 7

| | Inequality 1 | Inequalities 2 & 3 | Inequality 5 | Inequality 6 |
|---|---|---|---|---|
| First Embodiment | 5.50 | 1.64 | 1.55 | 0.82 |
| Second Embodiment | 4.75 | 1.78 | 1.33 | 0.83 |
| Third Embodiment | 4.70 | 1.80 | 1.10 | 0.72 |

As described above, according to the present invention, the thickness of an optical system is reduced by reducing the size of the reflection member such as a prism and placing a single lens element on the object side of the reflection member. Also, by using fewer lens elements to reduce cost and the overall length of the optical system, a slim, compact zoom lens system can be produced at a low cost. The slim, compact zoom lens system can be appropriately used for a photographing device included in or attached to ultracompact digital cameras or digital video cameras, mobile phones, portable information terminals, and personal digital assistants (PDAs).

While this invention has been particularly shown and described with reference to preferred embodiments thereof, it will be understood by those skilled in the art that various changes in form and detail may be made therein without departing from the spirit and scope of the invention as defined by the appended claims.

What is claimed is:

1. A high magnification zoom lens system comprising first through fifth lens groups respectively arranged sequentially from an object side,
   wherein at least one of the first through fifth lens groups moves during magnification change, the first lens group comprises a reflection member, and the zoom lens system satisfies the conditions $$3.8 \leq \frac{f_T}{f_W} \leq 6.0 \text{ and } 1.50 \leq \frac{L_T}{f_T} \leq 1.88$$

wherein "$f_W$" denotes the focal distance at the wide angle position, "$f_T$" denotes the focal distance at the telephoto position, and "$L_T$" denotes the overall length of the zoom lens system from the lens surface on the object side to an image plane, at the telephoto position.

2. The high magnification zoom lens system of claim 1, wherein at least the second lens group and the fourth lens group move during magnification change.

3. The high magnification zoom lens system of claim 1, wherein during magnification change from a wide angle position to a telephoto position, the interval between the second lens group and the third lens group decreases and the interval between the third lens group and the fourth lens group decreases.

4. The high magnification zoom lens system of claim 1, wherein the first lens group comprises a first lens element having a negative refractive power, a reflection member, and a second lens element having a positive refractive power and including an aspherical surface.

5. The high magnification zoom lens system of claim 1, wherein the fourth lens group comprises a lens element having a positive refractive power and a doublet having a negative refractive power, respectfully arranged sequentially from the object side.

6. The high magnification zoom lens system of claim 5, wherein at least one surface of the lens element having a positive refractive power is aspherical.

7. The high magnification zoom lens system of claim 1, wherein the fifth lens group comprises a single lens element having a positive refractive power.

8. The high magnification zoom lens system of claim 1, wherein the fifth lens group is formed of plastic.

9. The high magnification zoom lens system of claim 1, wherein the third lens group comprises two lens elements each having a positive refractive power, and satisfies the condition $$0.6 \leq \frac{f_3}{\sqrt{f_W f_T}} \leq 2.0$$

wherein "$f_W$" denotes the focal distance at the wide angle position, "$f_T$" denotes the focal distance at the telephoto position, and "$f_3$" denotes the focal distance of the third lens group.

10. The high magnification zoom lens system of claim 1, wherein the fifth lens group performs correction of an image plane according to a change in the object distance and satisfies the condition $$0.65 \leq |m_5| \leq 0.90$$

wherein "$m_5$" denotes the magnification of the fifth lens group at a telephoto position when the object distance is infinite.

11. A high magnification zoom lens system comprising a reflection member, a first lens group having a positive refractive power, a second lens group having a negative refractive power, a third lens group having a positive refractive power, a fourth lens group having a positive refractive power, and a fifth lens group having a positive refractive power, which are respectively arranged sequentially from a object side, and satisfies the conditions $$3.8 \leq \frac{f_T}{f_W} \leq 6.0 \text{ and } 1.50 \leq \frac{L_T}{f_T} \leq 1.95$$

wherein "$f_W$" denotes the focal distance at the wide angle position, "$f_T$" denotes the focal distance at the telephoto position, and "$L_T$" denotes the overall length of the zoom lens system from the lens surface on the object side to an image plane, at the telephoto position.

12. The high magnification zoom lens system of claim 11, wherein at least the second lens group and the fourth lens group move during magnification change.

13. The high magnification zoom lens system of claim 11, wherein during the magnification change from wide angle position to telephoto position, the interval between the second lens group and the third lens group decreases and the interval between the third lens group and the fourth lens group decreases.

14. The high magnification zoom lens system of claim 11, wherein the first lens group comprises a first lens element having a negative refractive power, a reflection member, and a second lens element having a positive refractive power and including an aspherical surface.

15. The high magnification zoom lens system of claim 11, wherein the fourth lens group comprises a lens element having a positive refractive power and a doublet having a negative refractive power, respectfully arranged sequentially from the object side.

16. The high magnification zoom lens system of claim 15, wherein at least one surface of the lens element having a positive refractive power is aspherical.

17. The high magnification zoom lens system of claim 11, wherein the fifth lens group comprises a single lens element having a positive refractive power.

18. The high magnification zoom lens system of claim 11, wherein the fifth lens group is formed of plastic.

19. The high magnification zoom lens system of claim 11, wherein the third lens group comprises two lens elements each having a positive refractive power, and satisfies the condition $$0.6 \leq \frac{f_3}{\sqrt{f_W f_T}} \leq 2.0$$

wherein "$f_W$" denotes the focal distance at the wide angle position, "$f_T$" denotes the focal distance at the telephoto position, and "$f_3$" denotes the focal distance of the third lens group.

20. The high magnification zoom lens system of claim 11, wherein the fifth lens group performs correction of an image plane according to a change in the object distance and satisfies the condition $$0.65 \leq |m_5| \leq 0.90$$

wherein "$m_5$" denotes the magnification of the fifth lens group at a telephoto position when the object distance is infinite.

* * * * *